(12) United States Patent
Kuhar (10) Patent No.: US 6,474,394 B2
(45) Date of Patent: *Nov. 5, 2002

(54) CORDLESS, BALANCED WINDOW COVERING

(75) Inventor: Otto Kuhar, Garfield, NJ (US)

(73) Assignee: Newell Window Furnishings, Inc., Freeport, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/835,343

(22) Filed: Apr. 16, 2001

(65) Prior Publication Data

US 2001/0018954 A1 Sep. 6, 2001

Related U.S. Application Data

(63) Continuation of application No. 09/497,849, filed on Feb. 4, 2000, now Pat. No. 6,234,236, which is a continuation of application No. 08/629,896, filed on Apr. 10, 1996, now Pat. No. 6,079,471, which is a continuation of application No. 08/303,773, filed on Sep. 9, 1994, now Pat. No. 5,531,257, which is a continuation-in-part of application No. 08/223,989, filed on Apr. 6, 1994, now Pat. No. 5,482,100.

(51) Int. Cl.[7] ................................................. E06B 9/30
(52) U.S. Cl. .................................. 160/170 R; 160/192
(58) Field of Search ...................... 160/170 R, 168.1 R, 160/171 R, 172 R, 84.02, 84.06, 191, 192, 193, 168.1 P, DIG. 17, 405; 185/37, 39, 45

(56) References Cited

U.S. PATENT DOCUMENTS

| 13,251 A | 7/1855 | Bixler |
|---|---|---|
| 322,732 A | 7/1885 | Lang |
| 842,401 A | 1/1907 | Goodill |
| 927,090 A | 7/1909 | Anderson |
| 948,239 A | 2/1910 | McManus |
| 1,636,601 A | 7/1927 | Givens |
| 1,721,501 A | 7/1929 | McKee |
| 1,731,124 A | 10/1929 | Carper |
| 1,789,655 A | 1/1931 | Iwata |
| 1,951,659 A | 3/1934 | Kesner |

(List continued on next page.)

FOREIGN PATENT DOCUMENTS

| DE | 40 03 218 A1 | 8/1991 |
|---|---|---|
| GB | 13798 | of 1893 |
| GB | 2 262 324 A | 6/1993 |

OTHER PUBLICATIONS

"The Theory and Design of Long–Deflection Constant –Force Spring Elements", by F. A. Votta, Jr., Lansdale, PA (12 pages).

Primary Examiner—David M. Purol
(74) Attorney, Agent, or Firm—Marshall, Gerstein & Borun (57) ABSTRACT

A cordless, balanced venetian blind or shade with a constant, or a variable force spring motor includes conventional window covering components without the outside hanging lifting cords or cord locking mechanisms. One or more spring motors are employed. A cord spool, in the preferred embodiment, is coupled to one of the spring drums to serve to wind the cords to cause the blind to be raised or lowered, simply by manipulation of the bottom bar of the blind system. Due to the spring forces, the system compensates for the increasing weight on the cords as the window covering is raised and for the decreasing weight as it is lowered.

32 Claims, 3 Drawing Sheets

U.S. PATENT DOCUMENTS

| | | | |
|---|---|---|---|
| 2,037,393 A | 4/1936 | Roberts | |
| 2,049,518 A | 8/1936 | Schier | |
| 2,110,983 A | 3/1938 | Carver | |
| 2,175,549 A | 10/1939 | Nardulli et al. | |
| 2,250,106 A | 7/1941 | Lorentzen | |
| 2,260,101 A | 10/1941 | De Falco | |
| 2,266,160 A | 12/1941 | Burns | |
| 2,276,716 A | 3/1942 | Cardona | |
| 2,324,536 A | 7/1943 | Pratt | |
| 2,325,992 A | 8/1943 | Wirthman | |
| 2,350,094 A | 5/1944 | Butts | |
| 2,390,826 A | 12/1945 | Cohn | |
| 2,410,549 A | 11/1946 | Olson | |
| 2,420,301 A | 5/1947 | Cusumano | |
| 2,509,033 A | 5/1950 | Carver | |
| 2,520,629 A | 8/1950 | Esposito | |
| 2,535,751 A | 12/1950 | Nardulli | |
| 2,598,887 A | 6/1952 | Burns | |
| 2,609,193 A | 9/1952 | Foster | 267/1 |
| 2,687,769 A | 8/1954 | Gershuny | |
| 2,824,608 A | 2/1958 | Etten | |
| 2,874,612 A | 2/1959 | Luboshez | |
| 3,141,497 A | 7/1964 | Greisser | |
| 3,194,343 A | 7/1965 | Sindlinger | |
| 3,358,612 A | 12/1967 | Bleuer | |
| 3,371,700 A | 3/1968 | Romano | |
| 3,485,285 A | 12/1969 | Anderle | |
| 3,487,875 A | 1/1970 | Shukat et al. | |
| 3,756,585 A | 9/1973 | Mihalcheon | |
| 3,817,309 A | 6/1974 | Takazawa | |
| 4,157,108 A | 6/1979 | Donofrio | |
| 4,205,816 A | 6/1980 | Yu | |
| 4,223,714 A | 9/1980 | Weinreich et al. | |
| 4,326,577 A | 4/1982 | Tse | |
| 4,344,474 A | 8/1982 | Berman | |
| 4,398,585 A | 8/1983 | Marlow | |
| 4,487,243 A | 12/1984 | Debs | |
| 4,574,864 A | 3/1986 | Tse | |
| 4,610,292 A | 9/1986 | Hausmann et al. | |
| 4,623,012 A | 11/1986 | Rude et al. | |
| 4,625,786 A | 12/1986 | Carter et al. | |
| 4,631,217 A | 12/1986 | Anderson | |
| 4,647,488 A | 3/1987 | Schnebly et al. | |
| 4,726,410 A | 2/1988 | Fresh | |
| 4,852,627 A | 8/1989 | Peterson et al. | |
| 4,856,574 A | 8/1989 | Minami et al. | |
| 4,862,941 A | 9/1989 | Colson | |
| 4,877,075 A | 10/1989 | Markowitz | |
| 4,880,045 A | 11/1989 | Stahler | |
| 4,886,102 A | 12/1989 | Debs | |
| 4,955,421 A | 9/1990 | Torti | |
| 4,984,617 A | 1/1991 | Corey | |
| 5,054,162 A | 10/1991 | Rogers | |
| 5,067,541 A | 11/1991 | Coslett | |
| 5,083,598 A | 1/1992 | Schon | |
| 5,103,888 A | 4/1992 | Nakamura | |
| 5,105,867 A | 4/1992 | Coslett | |
| 5,133,399 A | 7/1992 | Hiller et al. | |
| 5,141,041 A | 8/1992 | Katz et al. | |
| 5,157,808 A | 10/1992 | Sterner, Jr. | |
| 5,170,830 A | 12/1992 | Coslett | |
| 5,184,660 A | 2/1993 | Jelic | |
| 5,228,491 A | 7/1993 | Rude et al. | |
| 5,274,357 A | 12/1993 | Riordan | |
| 5,313,998 A | 5/1994 | Colson et al. | |
| 5,318,090 A | 6/1994 | Chen | |
| 5,320,154 A | 6/1994 | Colson et al. | |
| 5,363,898 A | 11/1994 | Sprague | |
| 5,391,967 A | 2/1995 | Domel et al. | |
| 5,413,161 A | 5/1995 | Corazzinni | |
| 5,482,100 A | 1/1996 | Kuhar | |
| 5,485,875 A | 1/1996 | Genova | |
| 5,531,257 A | 7/1996 | Kuhar | |
| 5,706,876 A | 1/1998 | Lysyj | |
| 5,855,235 A | 1/1999 | Colson et al. | |
| 6,079,471 A | 6/2000 | Kuhar | |

CORDLESS, BALANCED WINDOW COVERING

CROSS-REFERENCES TO RELATED APPLICATIONS

The present invention is a continuation of U.S. patent application Ser. No. 09/497,849 filed Feb. 4, 2000, now U.S. Pat. No. 6,234,236, issued May 22, 2001, which is a continuation of U.S. patent application Ser. No. 08/629,896 filed Apr. 10, 1996 (CPA filed Nov. 26, 1999), now U.S. Pat. No. 6,079,471, issued on Jun. 27, 2000, which is a continuation of U.S. patent application Ser. No. 08/303,773 filed Sep. 9, 1994, now U.S. Pat. No. 5,531,257, issued on Jul. 2, 1996, which is a continaution-in-part of U.S. patent application Ser. No. 08/223,989, filed Apr. 6, 1994, now U.S. Pat. No. 5,482,100, issued on Jan. 9, 1996.

BACKGROUND OF THE INVENTION

1. Field of the Invention

The present invention relates generally to the art of spring motors useful for a variety of applications, including venetian blinds and window shades. More specifically the present invention relates to a system in which lifting cords and cord locking mechanisms are eliminated from shades or blinds. Still more specifically, the invention relates to window covering systems which employ one or more constant or consistent, variable force springs to balance the weight of accumulated window covering material, depending upon the extent to which the blind or shade is raised or lowered. The present invention also relates to motorized blinds and shades.

2. Description of the Prior Art

Venetian blinds have been known for many years and typically include a plurality of slats made from metal, plastic, wood or other materials and supported by ladders. Such blinds typically include a bottom bar and a tilt mechanism to cause the slats to move from a horizontal position to a nearly vertical position to open and close the blinds with respect to the passage of light. It is also conventional with such systems to use lifting cords coupled to the bottom bar, passing through the slats and into mechanisms within the blind headrail. The cord is used to raise the bottom bar, accumulating individual slats as the bar is raised. Because of the natural tendency of the bar and accumulated slat weight to free fall, locking mechanisms are also commonly employed with such prior art devices. Pleated and other types of shades also include a bottom bar and similar raising, lowering, and cord locking mechanisms.

Several attempts have been made to eliminate the lifting cord locks, some of such attempts going back nearly 140 years. See, for example, Bixler, U.S. Pat. No. 13,251, issued Jul. 17, 1855 for "Inside Blinds." In this device, a pair of "fusees" are employed, namely spirally grooved pulleys, to wind a cord passing therebetween. The two fusees are arranged so that as a barrel spring is being wound the cord joining the fusees compensates for changes in spring force. A spool is provided for accumulation of the lifting cord.

U.S. Pat. No. 2,420,301, issued May 13, 1947 to Cusumano for "Venetian Blind" also employs a cone-shaped member with grooves and an elongate coil spring. This design dispenses with normal draw cords and provides a counterbalance so that the slats may be retained at any vertical position without a lock or anchorage and so that the blinds can be raised with relatively small effort.

A different device is shown in Pratt's U.S. Pat. No. 2,324,536 issued Jul. 20, 1943 for "Closure Structure." In this device, tapes and coil springs are employed to raise and lower a blind particularly suited for use in a vehicle such as a train. The complex structure disclosed in this patent is especially suitable for devices in which the bottom bar and the slats ride in tracks as they move upwardly and downwardly.

Other patents show various spring devices used with venetian blinds. For example, in Cohn's U.S. Pat. No. 2,390,826, issued Dec. 11, 1945 for "Cordless Venetian Blinds," two coil springs are used to provide even force, with a centrifugal pawl stop. The blind is raised by freeing the pawl to allow the spring to provide a lift assist. Other more conventional systems employing springs and ratchet and pawl mechanisms include those shown in Etten's U.S. Pat. No. 2,824,608, issued Feb. 25, 1958 for "Venetian Blind"; U.S. Pat. No. 2,266,160, issued Dec. 16, 1941 to Burns for "Spring Actuated Blind"; and U.S. Pat. No. 2,276,716, issued Mar. 17, 1942 to Cardona for "Venetian Blind."

Various attempts have also been made in the prior art to motorize blinds and shades. In most of these systems hard wiring is required because larger motors are required to move the bottom rail and accumulated window material.

None of the aforementioned patents disclose the use of spring motors of the type disclosed herein to eliminate the conventional pull cords and locks of venetian blinds or shades in a simple and easily adaptable mechanism having few components parts. A system which overcomes the disadvantages of the more complex and cumbersome systems of the prior art would represent a significant advance in this art.

SUMMARY OF THE INVENTION

The present invention features a cordless blind or shade in which a spring motor is used to eliminate conventional pull cord and cord-lock mechanisms.

The present invention also features a system in which either the spring strength or the number of spring motors may be altered, depending upon the size of the window covering. The invention further features techniques for increasing the friction on the cords used to raise and lower the blinds or shade to assist in maintaining a desired position against any spring force which may exist through the range of travel of the bottom bar.

The present invention still further features a system which is easy to adapt to a wide variety of blind or shade designs and sizes and the capability of applying spring forces in a variety of ways and combinations.

A different feature of the present invention is the use of spring motors and small electric motors to provide highly desirable automatic or remote controlled capabilities for shades and blinds.

How the present invention accomplishes these features will be described in the following detailed description of the most preferred embodiments, taken in conjunction with the FIGURES which illustrate blind systems, although shade applications are also enhanced by the present invention. Generally, however, the features are accomplished by employing constant force or consistent variable force spring motors in a blind or shade system, while eliminating conventional pull cord and associated cord-lock mechanisms. The features are accomplished by using springs wound on drums, the springs being of constant cross-section (constant force) or varying in width, thickness, or both along their length (variable force) whereby spring force imparted to a coiled spring is transferred from one drum to another. For these spring motors, such force is at its highest level when the blind or shade is fully raised, i.e., when the cords are supporting the full weight of the window covering. The spring force is at its lowest point when the window covering is fully lowered and, in the case of blinds, the slats are being individually supported by ladders, rather than by the cords, leaving only the bottom bar to be supported by the cord. In constant force systems, the spring force is substantially constant throughout the range of movement of its shade or blind bottom rack. The blinds and shades of the present invention may be manipulated by the operator simply grasping the bottom bar and urging it in an upward or downward direction.

The features of the present invention are also accomplished by providing selection criteria for the springs, to take into account the size and weight of a particular blind or shade or by adding additional spring motors for heavier or wider window coverings. To achieve greater certainty in maintaining desirable spring forces, in a most preferred, alternate form of the invention, the spring motors are interconnected to ensure that they operate in unison to provide a level action throughout the range of blind or shade travel. All of these features are accomplished in a blind or shade which will remain in the position selected by the user and which in a preferred embodiment may be motorized, e.g. by a small remote controlled DC motor. In an illustrated embodiment, friction imparting devices are, if necessary, used with the cords coupling the bottom bar and a spool within the headrail.

Other features of the invention, and other ways in which those features are accomplished, will become apparent to those skilled in the art after the detailed description of the most preferred embodiment is read and understood. Such other ways are deemed to fall within the scope of the invention.

DESCRIPTION OF THE DRAWINGS

In the various FIGURES, like reference numerals are used to indicate like components.

DETAILED DESCRIPTION OF THE PREFERRED EMBODIMENTS

Before proceeding with the detailed description of the preferred embodiments, several comments should be made about the applicability and the scope of the present invention. First, while venetian-type blinds are shown in certain of the FIGURES, the types of materials from which the blinds are made or the relative widths, heights and the configuration of the headrail, bottom rail and slats may vary widely. The present invention has applicability to a variety of such blinds. The present invention is also useful with window shades of various types since many shade designs also use lifting cords and would benefit from the features of this invention. Whenever blinds are mentioned herein, shades should be considered a suitable alternative.

Second, while preferred types of springs are shown, one varying in width, another varying in thickness and a third being of constant cross-section, a combination of the three could be employed. Other spring configurations could also be used, in addition to those having a rectangular cross-section. For example, springs with round or oval cross-sections, decreasing along its length (for a variable force spring) or a laminated spring could also be employed.

Figure 3:
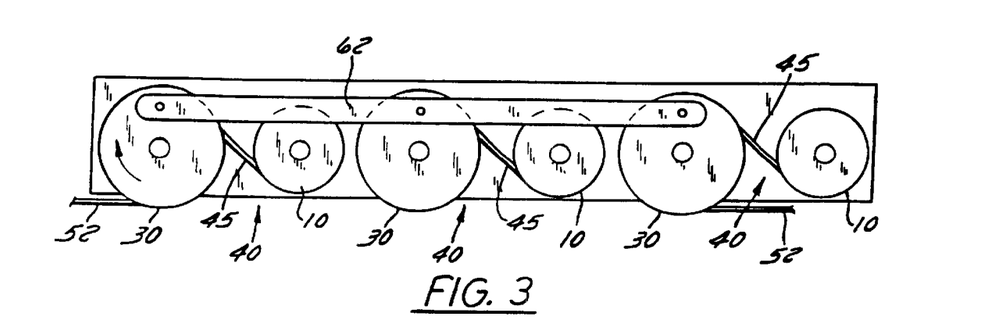
FIG. 3 is a schematic illustration of a combination of three spring motors, with the cord spools coupled together to ensure that all motors operate in unison.

Third, while one example is given of how to interconnect a plurality of spring motors, other techniques can be employed. For example, a gear system can be employed instead of the illustrated bar. The object of illustrative FIG. 3 is to show how the spring motors can be made to operate in unison for level raising or lowering of the blind or shade, even if the lifting forces are applied off center. Ideally, however, the user should be instructed to apply the lifting or lowering force at, or relatively near, the center of the bottom rail to maintain desirable balance and to prevent slack from being created in the lifting cords.

Figure 1A:
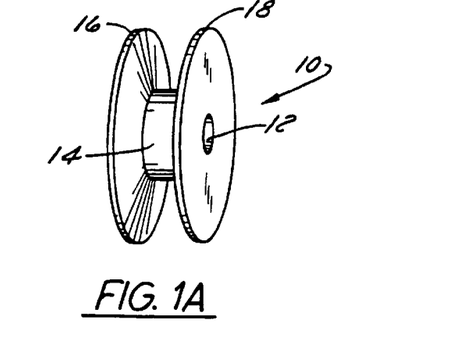
FIG. 1A is a perspective view of a spring storage drum useful in one preferred form of the present invention.

Proceeding now to a description of the FIGURES, FIG. 1 is a perspective view of one storage drum 10 useful in the preferred embodiment. Storage drum 10 includes an axial hole 12, a cylindrically-shaped spring storage area 14, and a pair of walls 16 and 18 which taper upwardly and outwardly from area 14. This particular storage drum is especially suitable for a spring which varies in width, as will be described later in this specification. Drum 10 will be referred to herein as a storage drum, i.e. the drum on which the spring is initially coiled. The drum 10 would have parallel walls 16 and 18 for other embodiments such as for the springs illustrated in FIGS. 5A, 5B, 8A, and 8B.

Figure 1B:
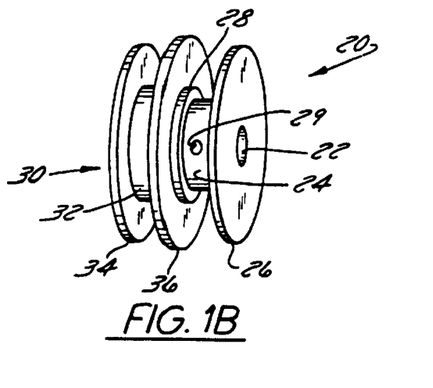
FIG. 1B is a perspective view of output drum, combined with a cord spool, useful in this preferred form of the present invention.

Proceeding next to FIG. 1B, an output drum is shown generally at 20 to include an axial hole 22, a cylindrical body 24, and a pair of walls 26 and 28. A hole 29 is provided on body portion 24, the purpose of which will become apparent shortly. Output drum 20 also includes a cord spool 30 having a central aperture (not shown) coaxial with hole 22, a body portion 32, and a pair of parallel side walls 34 and 36 defining an area therebetween for storage of the lifting cords.

Figure 2:
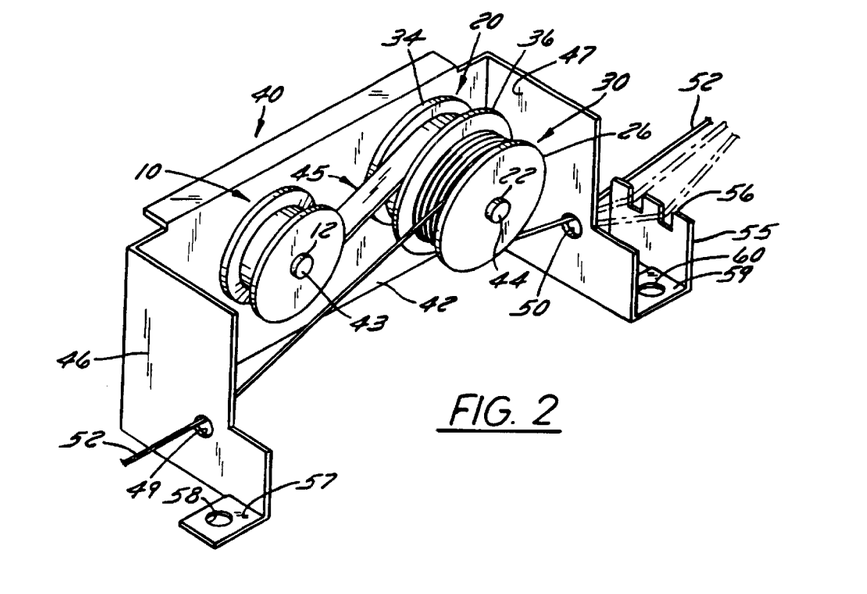
FIG. 2 is a schematic view of a spring motor together with one form of friction imparting device.

Proceeding next to FIG. 2, the arrangement of the devices in FIGS. 1A and 1B in a spring motor unit 40 is shown. Motor unit 40 includes a bracket having a planar back wall 42 onto which the storage drum 10 and output drum 20 are rotatably mounted in a spaced apart orientation. Axles 43 and 44 pass respectively through the apertures 12 and 22 of the drums 10 and 20. From FIG. 2, it will be appreciated that output drum 20 is located adjacent wall 42, with the cord spool 30 located outwardly therefrom.

A spring is illustrated at 45 and is coupled between storage drum 10 and output drum 20. The spring itself will be described later. The spring motor unit 40 also includes a pair of surfaces 46 and 47, which are parallel to one another and perpendicular to surface 42, defining a generally U-shaped enclosure for the two drums and the cord spool. A hole 49 is provided in surface 46 and a hole 50 is provided in surface 47, with lifting cords 52 shown passing through each toward the cord spool 30. The illustrated motor unit 40 also includes another bracket component 55 spaced apart from surface 47 and including a plurality of slots 56 in its upper edge. Solid and dashed lines illustrate how the slots 56 may be used to increase the tension on the cord 52 traveling through portion 47 toward cord spool 30.

Finally, two attachment areas 57 and 59 are shown in FIG. 2, with holes 58 and 60, respectively. The latter are used for attachment of the bracket to the blind head bracket. Obviously, the location of the mounting holes can vary widely, depending on the overall configuration of the blind with which the spring force motor unit 40 is to be used.

Before proceeding to more detailed descriptions of the springs 45, reference should now be made to FIG. 3, showing schematically how a plurality of spring motor units 40 may be coupled together, e.g. by an elongate bar 62 rotatably coupled to each of the respective cord spools 30 (or by gearing on the drums 10 and 20, not shown). It will be appreciated from this drawing, which is from a reverse perspective compared to that shown in FIG. 2, that the three spring motor units 40 will work in unison and the bar 62 will compensate for minor variations in spring forces which may exist for the individual springs 45 and ensure an even winding of the cords 52, even if the force to raise or lower the blind is applied off-center.

Figure 4A:
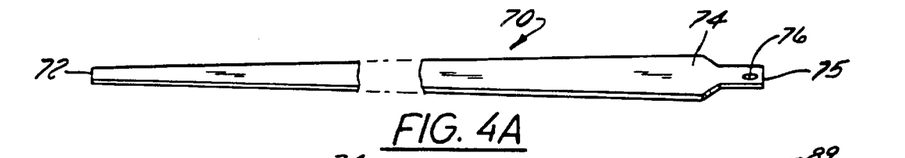
FIG. 4A is a perspective view of a strip of spring material varying in width along its length.
Figure 4B:
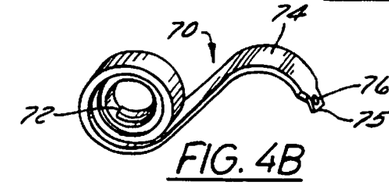
FIG. 4B is a schematic view of the spring shown in FIG. 4A wound into a coil.

Proceeding next to the descriptions of FIGS. 4A and 4B, a preferred spring 70 is shown, again in perspective form. Spring 70 includes a first narrower end 72, a second wider end 74 and a coupling extension 75 having a hole 76 therein. The illustrated spring has a constant thickness. Spring 70, in use, is wound onto the storage drum in the configuration illustrated in FIG. 4B, i.e. with its narrower end coupled to body portion 14, and its wider end toward the outside. The extension 75 is attached to the body portion 24 of output drum 20 using hole 76 and any suitable fastener. The spring is wound from one drum to the other in an opposite coil orientation. In other words, as spring 70 is transferred from the storage drum 10 to the output drum 20, the width of the spring 70 between the two drums will decrease and the spring will be wound oppositely to its original coil shape.

Figures 5A, 6, 7:
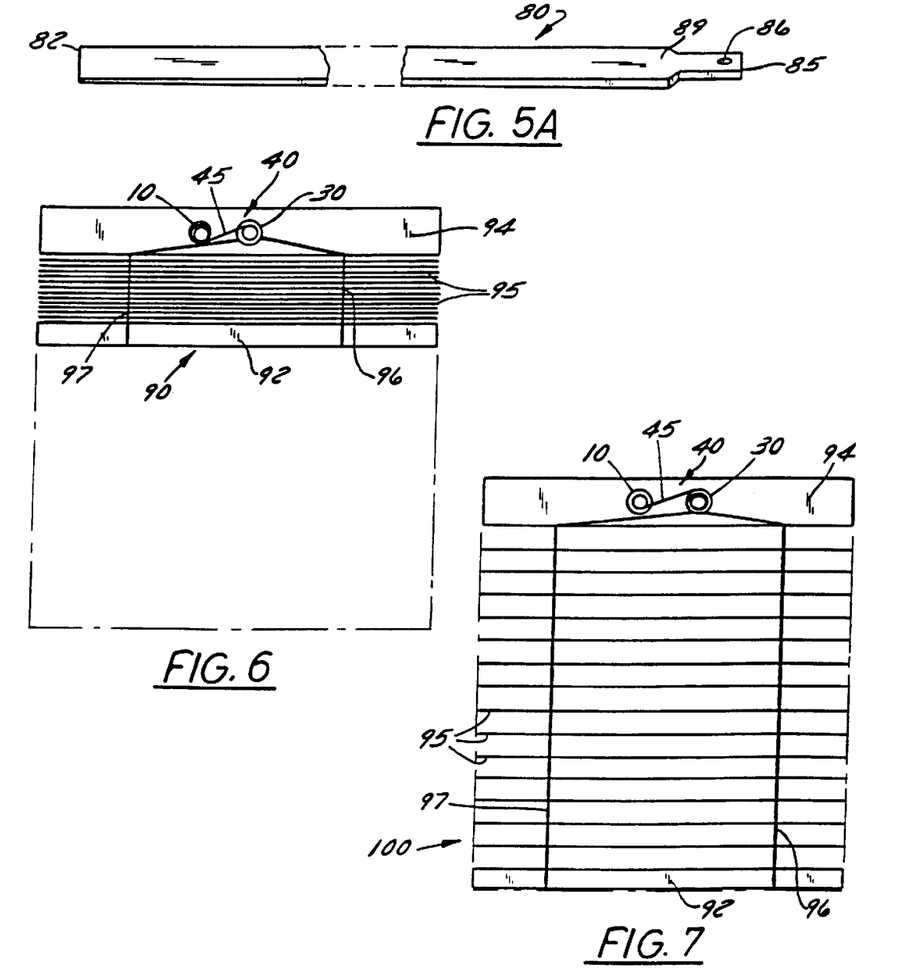
FIG. 5A is a schematic view of a spring varying in thickness along its length.
FIG. 6 is a schematic representation of a blind in the fully open position with the cord storage drum fully wound and a spring wound on its storage drum, the system thereby supporting the full weight of the slats and bottom bar.
FIG. 7 is a schematic illustration of the blind shown in FIG. 6, with the bottom bar in its fully lowered position and illustrating how the storage drum for the cords is substantially empty and the spring substantially transferred from its storage drum to its associated output drum.
Figure 5B:
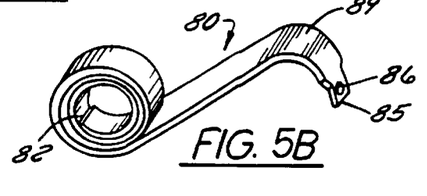
FIG. 5B is a view of the spring of FIG. 5A shown in a coiled position.

Another embodiment of a spring useful in the invention is shown in FIGS. 5A and 5B, i.e. a spring 80 having a varying thickness. Spring 80 has a thinner first end 82, a thicker second end 84 having a width equal to that of end 82, and a coupling extension 85 having a hole 86 therein. The preferred coil orientation for spring 80 is shown in FIG. 5B, this time with the thinner end 82 at the core of the storage drum 10 and the thicker end 84 extending onto and around the output drum 20, using coupling extension 85 and hole 86. Again, the orientation of the spring, as it is transferred from the storage drum 10 to the output drum 20, is reversed.

While it has been mentioned earlier that springs of different configurations may be employed for variable force spring motors, it will now be more fully appreciated that one variation would be to use a spring which varies both in width and thickness. Also, a coil spring of circular cross-section or a laminated spring could be employed. The cross-section increasing from the end attached to the storage drum 10 to the end attached to the output drum 20.

Proceeding now to FIG. 6, the use of a spring motor unit 40 for a blind system 90 is shown. Blind system 90 includes a bottom bar 92, a headrail 94, and a plurality of slats 95 located therebetween. The ladders are not illustrated in these FIGURES but are conventional and, in and of themselves, do not form part of the present invention. The cords for raising and lowering bottom bar 94 are illustrated at 96 and 97 and are shown extending through the slats and toward the cord spool 30, which will be fully wound with cord when the blind is in the position illustrated in FIG. 6. Moreover, the storage drum would be wound with most of spring 45 and the output drum would be wound only to the extent desirable to attach its end and to provide the desired holding force.

Referring now to FIG. 7, the bottom bar 92 is shown in its fully lowered position with the individual slats 95 spaced from one another and with the cords 96 and 97 unwound from cord spool 30. At this point, the slats would be individually suspended from ladders (not shown) attached to the headrail 94, so that their weight is not being carried by the spring motor unit 40. It can be observed that the spring 45 has been substantially transferred from the storage drum 10 to the output drum 20, thereby decreasing the amount of force exerted on the bottom bar. In an ideal situation, the spring force will be just sufficient to prevent bottom bar 92 from self-raising.

When it is desired to open blind system 90, the bottom bar 92 is urged toward headrail 94, resulting in a spring driven rotation of the cord spool to wind cords 96 and 97. The spring will rewind back to storage drum 10, with an ever increasing level of force as the weight of the bottom bar 92 and accumulating slats 95 continues to increase. The operation is completed when the FIG. 6 configuration is achieved.

While the present invention has been described in connection with several illustrated embodiments, further variations may now be apparent. For example, instead of using only two cords (illustrated as 96 and 97 in FIGS. 6–7), additional cords could be used for wider blinds, as required.

In connection with experiments done to date, one suitable spring is made from Type 301 High-Yield Stainless Steel and has a length of 87 inches and a constant thickness of 0.005 inches. Its width increased from 0.110 inches at its narrow end to 0.312 inches at its wide end. For a coil diameter of 0.540 inches, a theoretical maximum torque of 0.650 pounds per inch was created, and the theoretical torque minimum was 0.230 pounds per inch.

In another example, a spring strip of the same length and material varied in thickness from 0.0029 inches to 0.0054 inches with the same coil diameter. The theoretical maximum torque was 0.819 pounds per inch, while the torque at the bottom (minimum) is reduced to 0.140 pounds per inch. It can be seen from these examples that the spring motor provides a variable force which is consistent in application, depending upon the particular position of the bottom rail or member with respect to the headrail. The theoretical forces may be readily calculated using formulas which are available from spring manufacturers in which the output force is determined by the formula:

$$F = \frac{E \cdot b \cdot s^3}{24 \cdot r^2}$$

where:
- F=Output force
- E=Modulus of elasticity
- b=Width of spring strip
- s=Thickness of spring strip
- r=Constant coil radius.

It then becomes apparent that as the width or thickness varies from end to end of the strip, so also will the resultant force.

Figure 8A:
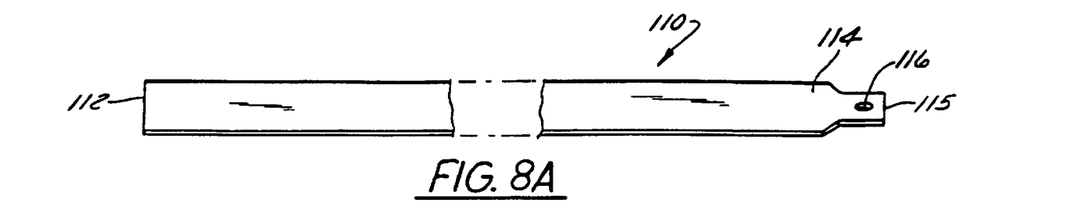
FIG. 8A is a perspective view of a strip of spring material being generally uniform in cross section along its length.
Figure 8B:
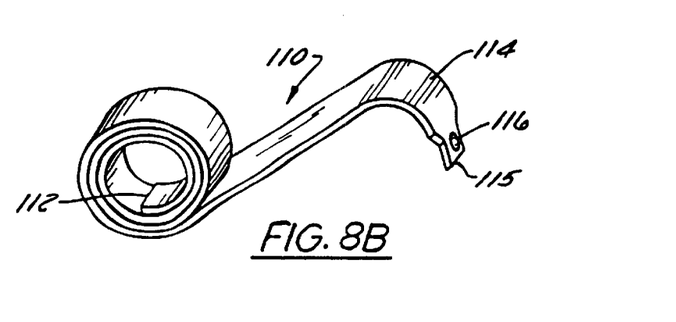
FIG. 8B is a schematic view of the spring shown in FIG. 8A wound into a coil.

FIGS. 8A and 8B show yet another embodiment of the present invention, this time where the spring 45 is a constant cross-section spring 110 having a first end 112, a second end 114, an extension 115 extending from the second end, and a hole 116 in the extension. The coiled form of spring 110 is shown in FIG. 8B.

It has been found that in some applications, for example applications where the blinds are short, or are made from very light materials, or where friction imparting devices are used with the cords that a constant force spring may be entirely suitable. This is true because while the weight exerted on the lifting cords 94 and 96 will vary as the blind is raised and lowered, frictional forces are present which can be sufficient to maintain the shade in any desired position without free fall. This particular embodiment could be enhanced using the friction imparting devices discussed in connection with FIG. 2. Accordingly, it can be readily seen that the present invention has extremely wide application and that the designer may make numerous choices depending upon the particular size of the blind, its construction materials, etc.

As with the other embodiments, several spring motors employing springs 110 can be coupled together, e.g. as is shown in FIG. 3. Alternatively, a plurality of such motors may be used which are not interconnected to one another.

Figure 9:
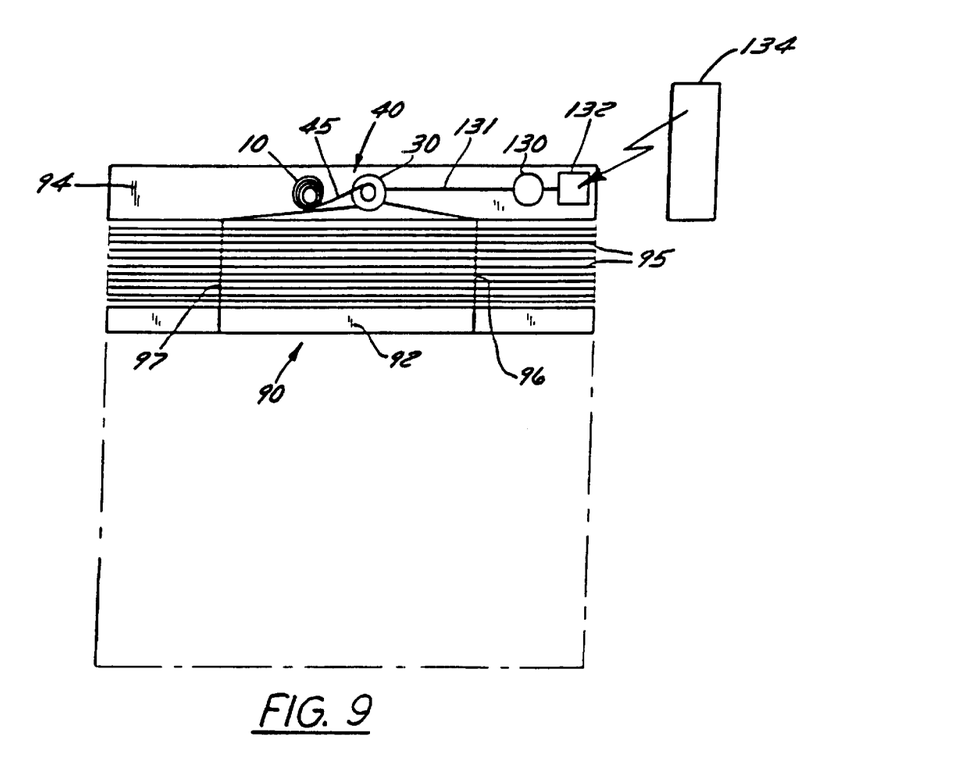
FIG. 9 is a view, similar to FIG. 6, but showing in schematic form a motor system for raising and lowering the blind.

FIG. 9 is a view, similar to FIG. 6, showing in schematic form a motor system for raising and lowering a blind. In order to facilitate understanding of the invention, like elements will be identified by like reference numerals in FIG. 9 and FIG. 6. Accordingly, in FIG. 9, a blind system 90 is illustrated having a spring motor unit 40 and cords 96,97 for raising and lowering bottom bar 92.

Also shown in FIG. 9 are a drive motor 110, and a control unit 112 for controlling operation of drive motor 110. Drive motor 110 is preferably an electrical motor which can drive in two directions and is operatively coupled with spring motor unit 40 by a coupling 111 to apply a drive force in either of two directions to move bottom bar 92 up or down. It is advantageous to use both spring motor unit 40 and drive motor 110 so that the force applied to blind system 90 by spring motor unit 40 augments and assists drive motor 110. Drive motor 110 may be operatively coupled anywhere in the driving mechanism of blind system 90. By such an arrangement a smaller, cheaper, and more energy-efficient drive motor 110 may be more advantageously employed with blind system 90 than could be employed alone without spring motor unit 40.

Control commands may be provided to control unit 112 for controlling operation of drive motor 110 from a remote position by hard-wired connection (not shown in FIG. 9) to a remote control unit such as remote control unit 114. In the alternative, remote control unit 114 may wirelessly communicate with control unit 112 by any of several methods, such as sonic coded signal patterns or optic coded signal patterns. The coding patterns may be coded transmission patterns, or coded frequency patterns, or combinations of such patterns.

In environments where there are a plurality of blind systems 90 which should be individually wirelessly controllable by one or more remote control units 114, respective blind systems 90 must be individually addressable. The required distinction among such a plurality of blind systems 90 may be encoded in each respective control unit 112 and recognized by remote control unit(s) 114 in any of several manners. For example, respective control units 112 may be user-coded by individual digital switches to assign a user-determined code to each respective blind system 90. Further, similar coding may be effected by embedding code in a read only memory (ROM) in each respective control unit 112, or by programming a code into a random access memory (RAM) in each control unit 112. A pin grid array or a jumper wire arrangement would also accomplish the desired coding, but such arrangements are susceptible to error and occupy large amounts of space.

Remote control unit 114 may similarly be encoded to selectively address a particular blind system 90: digital switch coding, ROM, RAM, and jumper-wiring may all be appropriate. Yet another approach involves factory preprogramming of systems. For example, a factory-provided library of codes may be programmed into a ROM in a remote control unit 114. A user may select a code from the library of codes for assignment to a respective blind system 90 by any of the above-described encoding mechanisms: e. g., digital switches, RAM, or the like. The user-selection may involve merely a two-digit entry or selection to identify an eight-digit (for example) digital code. By such an arrangement, the security of eight-digit coding and its protection against inadvertent operation of blinds is achieved with significantly less opportunity for errors in user-coding since the user needs only to enter two digits to identify/encode a particular blind system 90.

So while the invention has been described in connection with certain illustrative examples, it is not to be limited thereby but is to be limited solely by the scope of the claims which follow.

What is claimed is:

1. A method of arranging a window covering that includes a window covering material, a bottom member at least partially supporting a varying amount of the window covering material thereon during rasiing and lowering of the bottom member, and lift members operatively connected to the bottom member for raising and lowering the bottom member, comprising the steps of:

applying a first force to the lift members in a direction substantially opposite the direction of gravity, thereby tending to raise the bottom member, the first force being of sufficient magnitude to substantially offset the total weight of the bottom member and any window covering material accumuilated thereon; and providing sufficient friction within the window covering relative to the first force and the force of gravity operating on the window covering material and the bottom member to substantially inhibit movement of the bottom member, wherein the friction is applied continuously during movement of the bottom member.

2. The method of claim 1, wherein the step of applying the first force includes applying the first force by a spring motor.

3. The method of claim 2, further including operatively connecting the lift members to the spring motor.

4. The method of claim 1, wherein the step of providing sufficient friction includes providing a friction device.

5. The method of claim 1, wherein the step of providing sufficient friction includes providing an adjustable friction device.

6. The method of claim 4, wherein the step of providing sufficient friction includes applying friction to the lift members.

7. The method of claim 5, wherein the step of providing sufficient friction includes applying friction to the lift members.

8. The method of claim 4, wherein the step of applying the first force includes providing a first and a second spring coupled together.

9. A method of arranging a window covering that includes a window covering material, a head rail, a bottom member which at least partially supports a varying amount of the window covering material during raising and lowering of the bottom member, and lift members operatively connected to the bottom member for raising and lowering the window covering material, the weight of the window covering material being supported by the bottom member and lift members and varying in relation to the distance between the bottom member and the head rail, comprising the steps of:

applying a first force in a direction substantially opposite the direction of gravity and tending to raise the bottom member, the first force being variable in magnitude and related to the amount of window covering supported by the bottom member and lift members; and generating sufficient friction within the window covering relative to the first force and the force of gravity operating on the window covering to substantially inhibit movement of the bottom member, wherein the bottom member is positionable at any point along a range of movement thereof.

10. The method of claim 9, wherein the step of applying the first force includes applying the first force by a spring motor.

11. The method of claim 9, wherein the first force increases in magnitude as the distance between the bottom member and head rail is decreased.

12. The method of claim 9, wherein the step of generating sufficient friction includes providing a friction device.

13. The method of claim 9, wherein the step of generating sufficient friction includes providing an adjustable friction device.

14. The method of claim 12, wherein the step of generating friction includes applying friction to the lift members.

15. The method of claim 13, wherein the step of generating friction includes applying friction to the lift members.

16. The method of claim 9, wherein the step of applying the first force includes providing a first and a second spring coupled together.

17. A method of inhibiting the movement of a window covering that includes a window covering material, a bottom member at least partially supporting a varying amount of the window covering material thereon during raising and lowering of the bottom member, and lift members operatively connected to the bottom member for raising and lowering the bottom member, comprising the steps of:

applying a first force to the lift members in a direction substantially opposite the direction of gravity, thereby tending to raise the bottom member;

applying sufficient friction to balance the first force and the force of gravity operating on the window covering material and the bottom member to inhibit movement of the bottom member, wherein the friction is applied continuously during movement of the bottom member.

18. The method of claim 17, further providing an adjustable friction device to apply friction to the window covering.

19. The method of claim 18, wherein the step of applying sufficient friction includes adjusting the friction device.

20. The method of claim 19, wherein the step of applying sufficient friction includes applying friction to the lift members.

21. A method of arranging a window covering that includes a window covering material, a bottom member at least partially supporting a varying amount of the window covering material thereon during raising and lowering of the bottom member, and lift members operatively connected to the bottom member for raising and lowering the bottom member, comprising the steps of:

applying sufficient friction within the window covering to balance the first force and the force of gravity operating on the window covering material and the bottom member to inhibit movement of the bottom member;

repositioning the bottom member by directly applying a first force to the lift members in a direction substantially opposite the direction of gravity.

22. The method of claim 21, wherein the step of applying the first force includes applying the first force by a spring motor.

23. The method of claim 21, wherein the step of providing sufficient friction includes providing a friction device.

24. The method of claim 23, wherein the step of providing sufficient friction includes applying friction to the lift members.

25. A method of arranging a window covering that includes a window covering material, a bottom member at least partially supporting a varying amount of the window covering material thereon during raising and lowering of the bottom member, and lift members operatively connected to the bottom member for raising and lowering the bottom member, comprising the steps of:

repositioning the bottom member by applying a generally upward force to the lift members in a direction substantially opposite the direction of gravity, thereby tending to raise the bottom member, without first applying a generally downward force;

applying sufficient friction within the window covering to inhibit movement of the bottom member by balancing the generally upward force and the force of gravity operating on the window covering material and the bottom member.

26. The method of claim 25, wherein the step of applying the first force includes applying the first force by a spring motor.

27. The method of claim 25, wherein the step of providing sufficient friction includes providing a friction device.

28. The method of claim 27, wherein the step of providing sufficient friction includes applying friction to the lift members.

29. A method of arranging a window covering that includes a window covering material, a bottom member at least partially supporting a varying amount of the window covering materials thereon during raising and lowering of the bottom member, and lift members operatively connected to the bottom member for raising and lowering the bottom member, comprising the steps of:

applying a first force to the lift members in a direction substantially opposite the direction of gravity, thereby tending to raise the bottom member;

applying sufficient friction to balance and first force and the force of gravity operating on the window covering material and the bottom member to inhibit movement of the bottom member, wherein the bottom member is positionable at any point along a range of movement thereof.

30. The method of claim 29, wherein the step of applying the first force includes applying the first force buy a spring motor.

31. The method of claim 29, wherein the step of providing sufficient friction includes providing a friction device.

32. The method of claim 31, wherein the step of providing sufficient friction includes applying friction to the lift members.

* * * * *

UNITED STATES PATENT AND TRADEMARK OFFICE
CERTIFICATE OF CORRECTION

PATENT NO. : 6,474,394 B2
DATED : November 5, 2002
INVENTOR(S) : Otto Kuhar

It is certified that error appears in the above-identified patent and that said Letters Patent is hereby corrected as shown below:

Column 8,
Line 46, please delete "during rasiing" and insert -- during raising -- therefore.
Line 55, please delete "material accumuilated" and insert -- accumulated -- therefore.

Column 10,
Line 62, please delete "to balance and first force" and insert -- to balance the first force -- therefore.

Signed and Sealed this

Twenty-ninth Day of April, 2003

JAMES E. ROGAN
*Director of the United States Patent and Trademark Office*